US009495289B2

(12) United States Patent
Griffin et al.

(10) Patent No.: US 9,495,289 B2
(45) Date of Patent: *Nov. 15, 2016

(54) SOLID STATE MEMORY DEVICE LOGICAL AND PHYSICAL PARTITIONING

(71) Applicant: International Business Machines Corporation, Armonk, NY (US)

(72) Inventors: Thomas J. Griffin, Salt Point, NY (US); Dustin J. VanStee, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/096,496

(22) Filed: Dec. 4, 2013

(65) Prior Publication Data

US 2014/0095773 A1    Apr. 3, 2014

Related U.S. Application Data

(63) Continuation of application No. 13/627,496, filed on Sep. 26, 2012.

(51) Int. Cl.
*G06F 12/02* (2006.01)
*G06F 12/10* (2016.01)

(52) U.S. Cl.
CPC ....... *G06F 12/0246* (2013.01); *G06F 12/1009* (2013.01)

(58) Field of Classification Search
CPC .................................................. G06F 12/0246
USPC ................................................. 711/103, 173
See application file for complete search history.

(56) References Cited

U.S. PATENT DOCUMENTS

| 8,122,193 | B2 | 2/2012 | Song et al. |
| 8,626,991 | B1* | 1/2014 | Beauchamp ................. 711/103 |
| 2006/0184740 | A1* | 8/2006 | Ishikawa ............... G06F 12/084 |
| | | | 711/129 |
| 2007/0168690 | A1* | 7/2007 | Ross .................... G06F 11/0712 |
| | | | 714/4.11 |
| 2010/0042774 | A1 | 2/2010 | Yang et al. |
| 2010/0153620 | A1 | 6/2010 | McKean et al. |
| 2011/0082967 | A1 | 4/2011 | Deshkar et al. |

(Continued)

FOREIGN PATENT DOCUMENTS

| TW | 201022933 | 6/2010 |
| TW | 201027420 | 7/2010 |

OTHER PUBLICATIONS

Sun StorEdge 3000 Family Raid Firmware 4.2x User's Guide, Basic Raid Concepts, 2009, Dot Hill Systems Corporation.*

(Continued)

*Primary Examiner* — Ryan Bertram
*Assistant Examiner* — Edmund Kwong
(74) *Attorney, Agent, or Firm* — Cantor Colburn LLP; Margaret McNamara (57) ABSTRACT

Embodiments relate to solid state memory device including a storage array having a plurality of physical storage devices and the storage array includes a plurality of partitions. The solid state memory device also includes a controller comprising a plurality of mapping tables, wherein each of the plurality of mapping tables corresponds to one of the plurality of partitions. Each of the plurality of mapping tables is configured to store a physical location and a logical location of data stored in its corresponding partition.

8 Claims, 6 Drawing Sheets

(56) References Cited

U.S. PATENT DOCUMENTS

2011/0264843 A1* 10/2011 Haines et al. ............... 711/103
2013/0061019 A1* 3/2013 Fitzpatrick et al. .......... 711/173
2013/0067191 A1* 3/2013 Mehra et al. ................. 711/173
2014/0095827 A1* 4/2014 Wei et al. .................... 711/203

OTHER PUBLICATIONS

Soberano, R., CS 111: Lecture 16—Robustness, Parallelism, and NFS, Scribe Notes for Monday, Mar. 12, 2012, http://www.cs.ucla.edu/classes/winter12/cs111/scribe/16a/.*

Sun StorEdge 3000 Family Raid Firmware 4.2x User's Guide, Basic Raid Concepts, 2009.*

Jordan, Larry, Edit Smarter, RAIDs, SSDs, iCLOUD & Performance, Aug. 19, 2012.*

Tom's Hardware, The Authority on Tech, SSD Boot Drive and two 1TB drives in Raid 0 for storage, Jul. 22, 2010.*

Goodwin, Paul, SSDs and Raid: What's the right strategy, Flash Forward, CES 2011.*

Park, et al., "Buffer Flush and Address Mapping Scheme for Flash Memory Solid-State Disk", Journal of Systems Architecture 56, 2010, pp. 208-220.

* cited by examiner

SOLID STATE MEMORY DEVICE LOGICAL AND PHYSICAL PARTITIONING

CROSS-REFERENCE TO RELATED APPLICATIONS AND PRIORITY CLAIM

This application is a continuation of and claims priority from U.S. patent application Ser. No. 13/627,496, filed on Sep. 26, 2012, entitled "SOLID STATE MEMORY DEVICE LOGICAL AND PHYSICAL PARTITIONING", the entire contents of which are incorporated herein by reference.

BACKGROUND

The present invention relates generally to solid state memory devices, and more specifically, to optimizing the performance of solid state memory devices by partitioning.

The process of selecting which memory pages to displace from central storage and transfer to auxiliary storage is called page stealing, or page replacement. Pages of memory stored in real storage may need to be transferred to auxiliary storage depending on real storage usage patterns and the need for real storage by critical or high priority work. The pool of auxiliary storage available to the system may include a mixture of storage mediums, such as solid state memory device and direct access storage devices (DASD) storing for example, paging data sets.

The response time and performance consistency of a solid state memory device is impacted by previously run workloads in addition to a current workload, or workload of interest. Solid state memory devices, such as flash devices, include a set of access restrictions that force modern solid state memory controllers to employ features such as wear leveling to evenly utilize and wear over time. The introduction of the wear leveling style algorithms forces the solid state memory controllers to employ a mapping table to keep track of physical versus logical location of stored data. As the data is written to the device the mapping table is updated to keep track of where the new logical data is stored in the device based on the available free blocks in the solid state memory device. To gather a performance measurement for a specific workload, it takes time to stabilize the mapping table to the particular workload and hence it can require hours to get the device in the proper state. Furthermore as more workloads are generated for the solid state memory device, the performance results for the new workload are highly dependent on the previous activity to the device due to the preconditioning effect. This problem can make it very difficult to predict/understand device performance and response time.

SUMMARY

Embodiments include a solid state memory device including a storage array having a plurality of physical storage devices and the storage array includes a plurality of partitions. The solid state memory device also includes a controller comprising a plurality of mapping tables, wherein each of the plurality of mapping tables corresponds to one of the plurality of partitions. Each of the plurality of mapping tables is configured to store a physical location and a logical location of data stored in its corresponding partition.

Embodiments also include a method of optimizing the performance of a solid state memory device by partitioning. The method includes creating a plurality of partitions of a storage array including one or more physical storage devices and creating a plurality of mapping tables, each corresponding to one of the partitions. The method also includes receiving a new workload from an auxiliary storage manager and assigning the new workload to one of the plurality of partitions.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

In exemplary embodiments, a solid state memory device includes a controller configured to support a plurality of mapping tables that each correspond to one of a plurality of partitions of the solid state memory device. The use of multiple partitions and mapping tables prevents workloads assigned to one partition from disturbing other partitions. In exemplary embodiments, the workloads associated with each partition may be configured to facilitate more efficient use of the solid state memory device and increase performance consistency.

Figure 1:
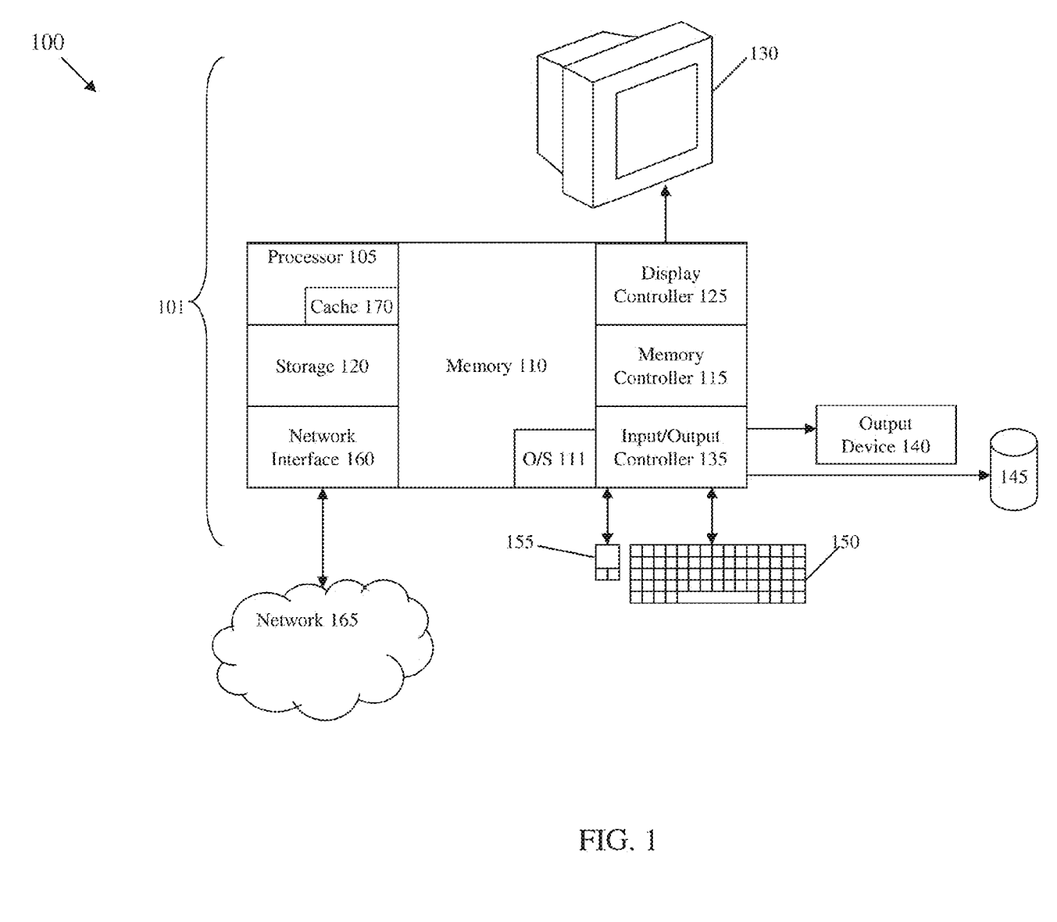
FIG. 1 depicts a block diagram of a system in accordance with an exemplary embodiment.

FIG. 1 illustrates a block diagram of an exemplary computer system 100 for use with the teachings herein. The methods described herein can be implemented in hardware software (e.g., firmware), or a combination thereof. In an exemplary embodiment, the methods described herein are implemented in hardware, and is part of the microprocessor of a special or general-purpose digital computer, such as a personal computer, workstation, minicomputer, or mainframe computer. The system 100 therefore includes general-purpose computer 101.

In an exemplary embodiment, in terms of hardware architecture, as shown in FIG. 1, the computer 101 includes a processor 105, memory 110 coupled via a memory controller 115, a storage device 120, and one or more input and/or output (I/O) devices 140, 145 (or peripherals) that are communicatively coupled via a local input/output controller 135. The input/output controller 135 can be, for example, but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The storage device 120 may include one or more hard disk drives (HDD), solid state drives (SSD), or any other suitable form of storage.

The processor 105 is a computing device for executing hardware instructions or software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing instructions. The processor 105 may include a cache 170, which may be organized as a hierarchy of more cache levels (L1, L2, etc.).

The memory 110 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The instructions in memory 110 may include one or more separate programs, each of which comprises an ordered listing of executable instructions for implementing logical functions. In the example of FIG. 1, the instructions in the memory 110 include a suitable operating system (OS) 111. The operating system 111 essentially controls the execution of other computer programs and provides scheduling, input-output control, file and data management, memory management, and communication control and related services.

In an exemplary embodiment, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In an exemplary embodiment, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In an exemplary embodiment, network 165 can be a managed IP network administered by a service provider. The network 165 may be implemented in a wireless fashion, e.g., using wireless protocols and technologies, such as Wi-Fi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the instructions in the memory 110 may further include a basic input output system (BIOS) (omitted for simplicity). The BIOS is a set of essential routines that initialize and test hardware at startup, start the OS 111, and support the transfer of data among the storage devices. The BIOS is stored in ROM so that the BIOS can be executed when the computer 101 is activated.

When the computer 101 is in operation, the processor 105 is configured to execute instructions stored within the memory 110, to communicate data to and from the memory 110, and to generally control operations of the computer 101 pursuant to the instructions.

Solid state memory devices include complex management algorithms which include constant read-modify-write activity. Every time that data is written to a solid state memory device, data stored on the solid state memory device is moved, check bits are adjusted and also written. Solid state memory devices also include 'garbage collection' algorithms that operate in the background and free up data blocks by moving and pooling data blocks. If small block writes are done for hours, the entire solid state memory device can become organized over time on a small block basis. Then, when a large block write then occurs, the background algorithm must free up enough small blocks so that it can aggregate them into a large block to provide a place for the incoming data to be written. This background process quickly comes to dominate the performance of the solid state memory device when a burst of large block writes occurs after a drive is preconditioned with a long period of small block writes. In exemplary embodiments, by ensuring that all data writes to the solid state memory device are done in ideal block sizes the degradation of the behavior of the storage technology related to background processing can be overcome.

Figure 2:
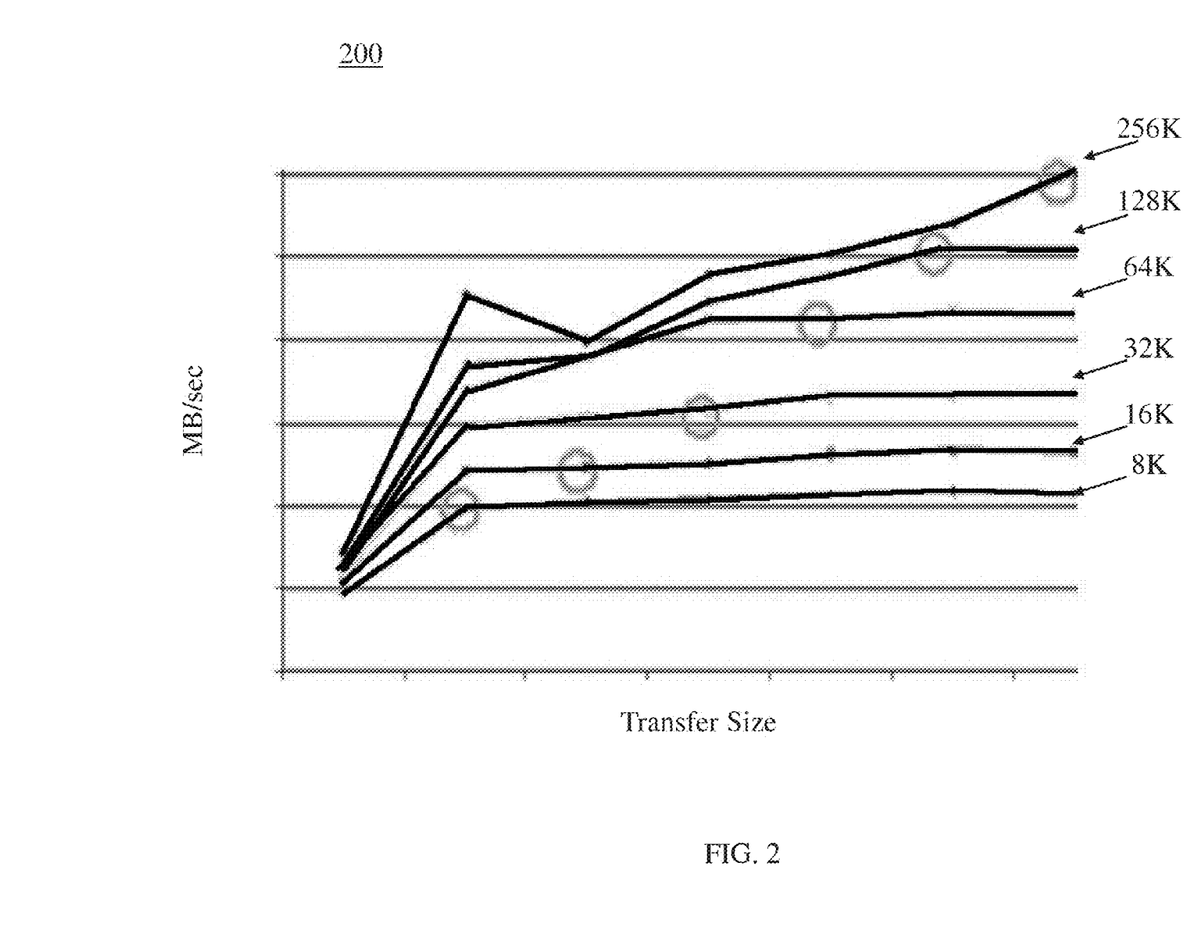
FIG. 2 depicts a graph illustrating the effect of block size on write operations in a solid state memory device.

Referring now to FIG. 2, a graph 200 illustrating the effect of write block size on write operations in a solid state memory device is shown. The graph illustrates the throughput in MB/sec of writing data to the solid state memory device after the solid state memory device has been pre-conditioned with writes over a period of time with various pre-condition block sizes. As illustrated, as the transfer block size of the data written to the solid state memory device increases the write throughput of the solid state memory device increases. Furthermore, the write throughput of the solid state memory device is at a maximum when the solid state memory device has been pre-conditioned with large block sizes of data.

Figure 3:
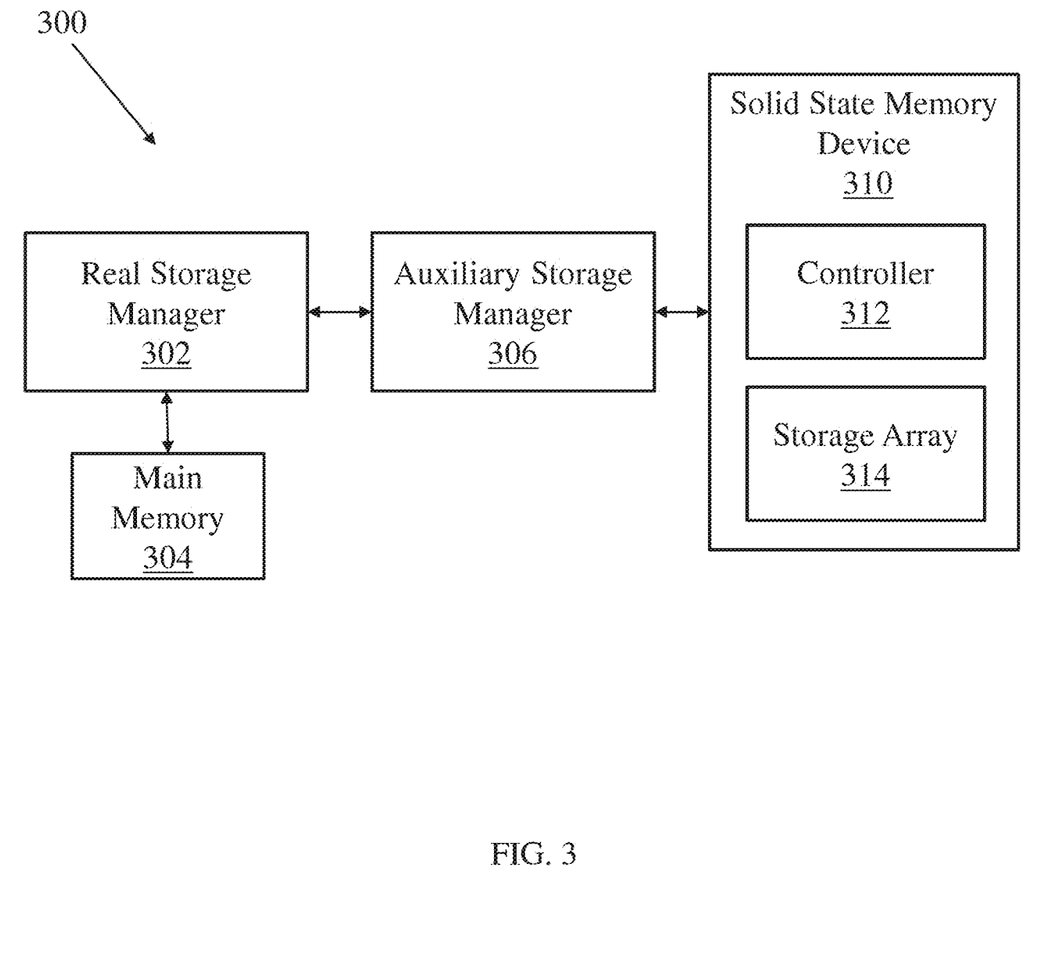
FIG. 3 depicts a block diagram of system for memory management including a solid state memory device in accordance with an exemplary embodiment.

Referring now to FIG. 3, a block diagram of system 300 for memory management including a solid state memory device 310 in accordance with an exemplary embodiment is shown. As illustrated, the system 300 includes a real storage manager 302 that is in communication with and configured to manage a main memory 304. The system 300 also includes an auxiliary storage manager 306 that is in communication with one or more solid state memory devices 310. In exemplary embodiments, the solid state memory device 310 includes a controller 312, which controls the operation of the storage array 314 of the solid state memory device 310. In exemplary embodiments, the controller 312 is configured to support a plurality of mapping tables that each correspond to a partition of a storage array 314.

In exemplary embodiments, the real storage manager 302 is configured to select a set of pages to evict from the main memory 304 and to call the auxiliary storage manager 306 to write content of the selected pages to one of the solid state memory devices 310. In exemplary embodiments, the auxiliary storage manager 306 is configured to choose a logical location and logical partition in the solid state memory device 310 to store the content of the selected pages. After selecting a logical location and partition in the solid state memory device 310, the auxiliary storage manager 306 initiates an I/O operation to write the selected pages to the solid state memory devices 310. The controller 312 of the solid state memory device 310 receives the write instructions from the auxiliary storage manager 306 and writes the selected pages to an assigned partition of the storage array 314 of the auxiliary storage manager 306. In addition, the controller 312 updates the partition's mapping table with the logical address and corresponding physical address that the selected pages were stored at. Upon completion of the I/O operation the auxiliary storage manager 306 notifies the real storage manager 302 that the I/O operation is complete. In alternative embodiment, the real storage manager and auxiliary storage manager can also work together in the traditional operating system environment, where the solid state memory device is used for storage of files on a file system, or as a raw device that can be managed by an application such as a database. The operating system or application can allocate a portion of the drive to be available for small random access files, and the other portion of the solid state memory device for large files. The method of allocating partitions of the solid state memory device to access patterns of similar transfer size and locality can yield better overall performance for the accesses to the device.

Figure 4A:
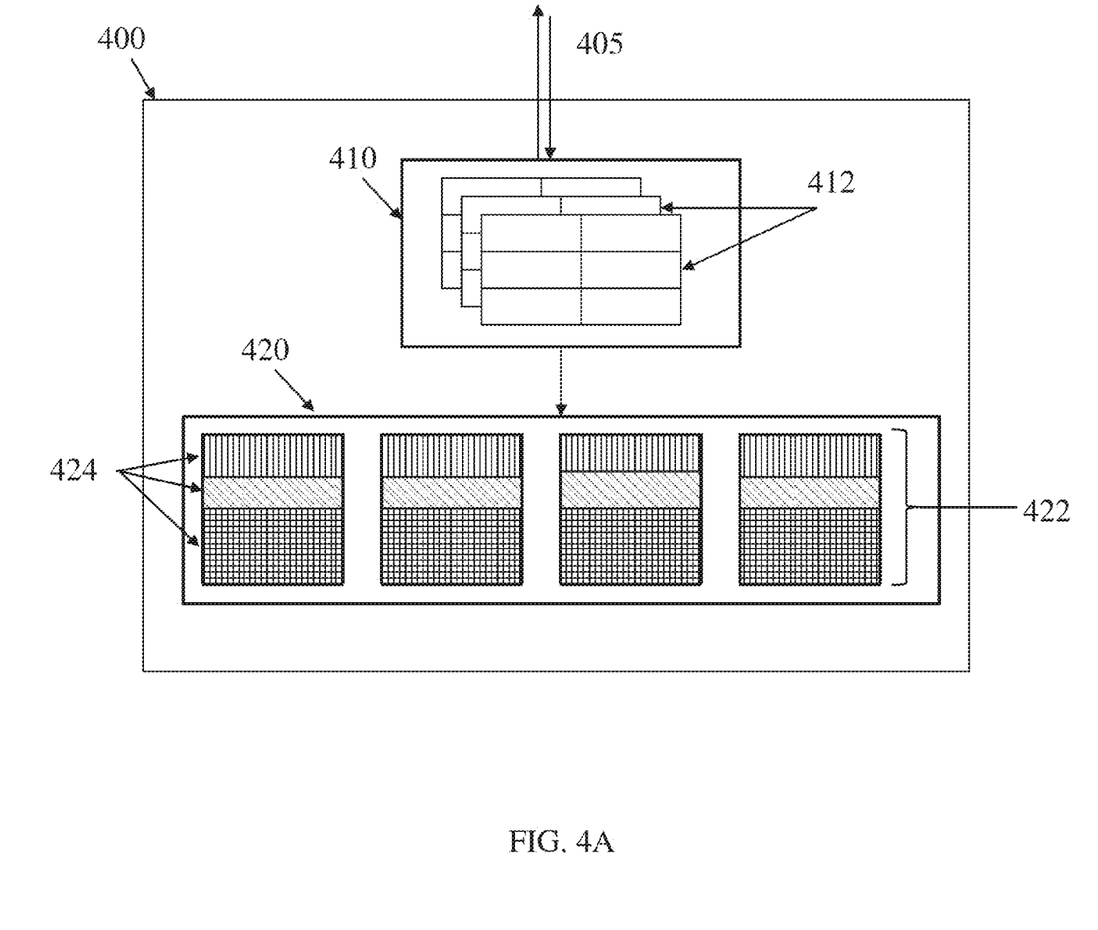
FIG. 4A-B depict block diagrams of solid state memory devices including a partitioned storage array in accordance with an exemplary embodiment.
Figure 4B:
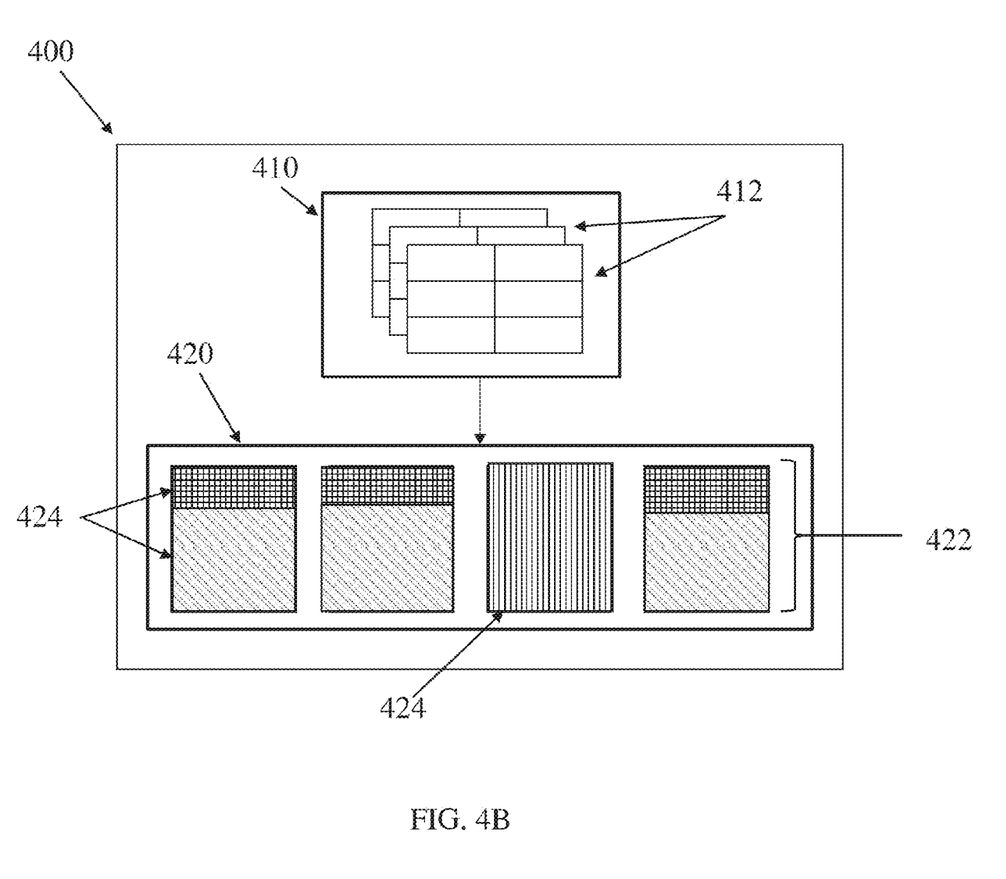

Referring now to FIGS. 4A and 4B, block diagrams of solid state memory devices 400 including a controller 410 and a storage array 420 in accordance with exemplary embodiments are shown. In exemplary embodiments, the controller 410 includes a plurality of mapping tables 412 and the storage array 420 includes a plurality of physical storage devices 422. The plurality of physical storage devices 422 include a plurality of partitions 424 that each correspond to one of the mapping tables 412. In exemplary embodiments, the plurality of physical storage devices 422 may be divided into the plurality of partitions 424 in a variety of manners, as shown in FIGS. 4A and 4B. For example, the partitions 424 may be configured to include portions of one or more physical storage devices 422 and the physical storage devices 422 may be configured to include one or more partitions 424. The configuration of the solid state memory device will be controlled over a controller interface (405) such as, but not limited to, SATA/SAS/PCI. The command to configure the partitions on the solid state memory device will be architected to support a starting logical address and size. Furthermore, extra inputs can be set to specify the amount of physical flash devoted to the logical address range. In this way, the overprovision of each of the partitions in the solid state device can be controlled. For example, a partition that is more heavily written relative to other partitions may be given a larger overprovision space in order to equalize wear across the entire storage array. It will be a illegal to overlap the logical/physical address ranges of multiple partitions. The partition command will also support a method to remove partitions when they are no longer needed so that the storage can be reallocated to new partitions in the future.

In exemplary embodiments, the plurality of mapping tables 412 of the controller 410 are configured to keep write operations to one partition 424 from disturbing other partitions 424. In exemplary embodiments, as new workloads are received by the solid state memory device 400, the controller 410 assigns the workload to a partition 424. The controller 410 is configured to manage the partitions 424 of the physical storage devices 422 with the corresponding mapping table 412 keeping track of the logical to physical lookups. In exemplary embodiments, the controller 410 may assign the workloads to a partition based upon a characteristic of the workload.

In exemplary embodiments, the workloads can be classified at the system level to identify attributes that would allow for workloads with similar characteristics to run on the same partition. For example, the characteristics may include a typical transfer size of I/O. Accordingly, a much more deterministic behavior can be achieved by the solid state memory device 400 as each separate partition 424 is only modified by workloads associated with it. In exemplary embodiments, the workloads associated with the partition are organized to increase the performance consistency of the solid state memory device 400. In addition, partitioning the solid state memory device 400 allows for any locality and organization in a set of workloads that leverage a partition to be exploited. In exemplary embodiments, different workloads are assigned to separate physical segments of physical storage. While the workloads will share the solid state memory device bandwidth, the mixing of workloads in the logical to physical table is eliminated and the controller is able to manage each partition separately.

Figure 5:
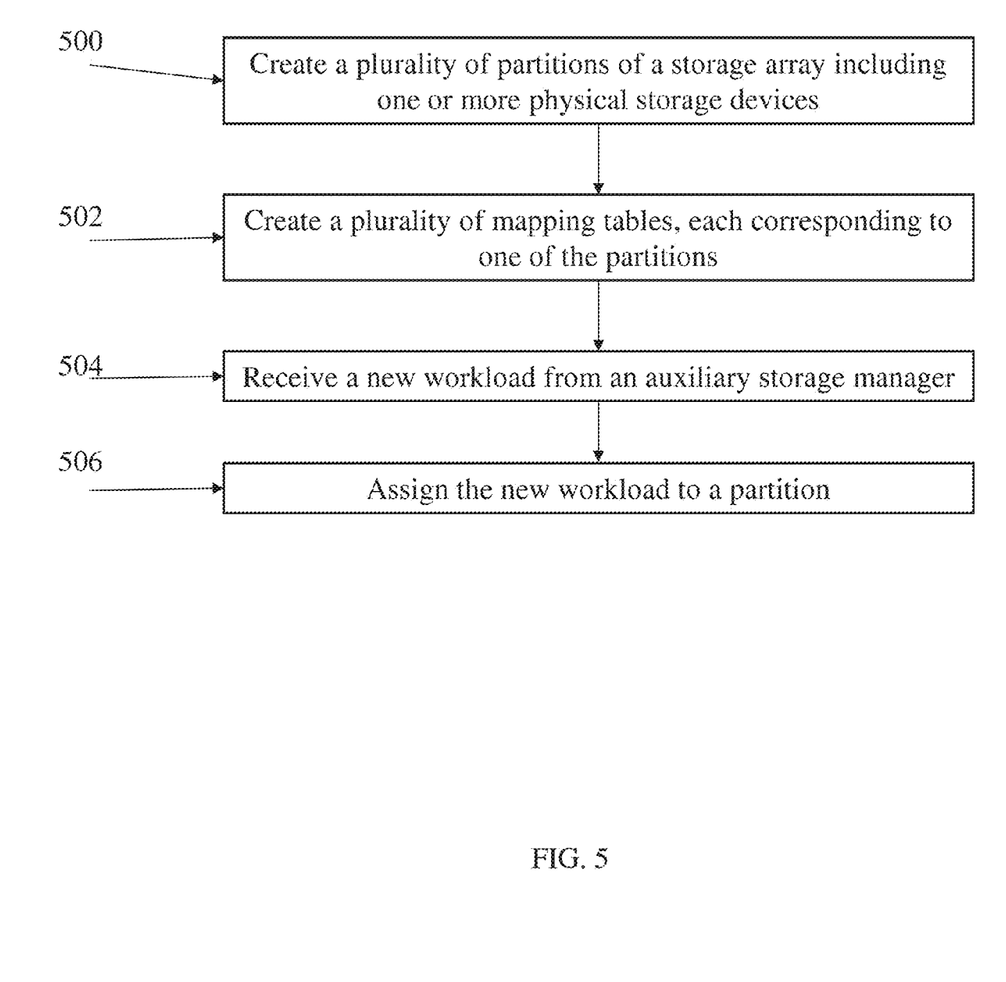
FIG. 5 depicts a process flow for a method of optimizing the performance of solid state memory device by partitioning in accordance with an exemplary embodiment.

Referring now to FIG. 5, a process flow for a method of optimizing the performance of solid state memory device by partitioning in accordance with an exemplary embodiment is shown. As shown at block 500, the method includes creating a plurality of partitions of a storage array including one or more physical storage devices. Next, as shown at block 502, the method includes creating a plurality of mapping tables, each corresponding to one of the partitions. The method also includes receiving a new workload from an auxiliary storage manager, as shown at block 504. Next, the method includes assign the new workload to a partition, as shown at block 506. In exemplary embodiments, the workload may be assigned to a partition based upon one or more characteristics of the workload.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit. Such program code may be created using a compiler or assembler for example, to assemble instructions, that, when executed perform aspects of the invention.

The terminology used herein is for the purpose of describing particular embodiments only and is not intended to be limiting of embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles and the practical application, and to enable others of ordinary skill in the art to understand the embodiments with various modifications as are suited to the particular use contemplated.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described above with reference to flowchart illustrations and/or schematic diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method of optimizing the performance of a solid state memory device by partitioning, the method comprising:
creating a plurality of partitions of a storage array including a plurality of physical storage devices, wherein each of the plurality of partitions are configured to store pages evicted from a main memory, wherein two or more of the plurality of physical storage devices includes at least a portion of two or more of the plurality of partitions, and wherein one or more of the plurality of partitions is entirely stored on only one of the plurality of physical storage devices;
configuring the plurality of partitions to allocate a first portion of the plurality of partitions for small random access files and a second portion of the plurality of partitions for large random access files;

creating a plurality of mapping tables, each corresponding to one of the partitions, wherein a logical to physical lookup for data stored in each of the partitions is managed by only a single one of the plurality of mapping tables;

receiving a read or write command to a logical address; and mapping the read or write command to one of the plurality of partitions and mapping tables, wherein each of the plurality of mapping tables is configured to support a different ratio of logical to physical addresses to enable different levels of overprovisioning for each partition, wherein the level overprovisioning for each of the plurality of partitions is based on and positively correlated with a write frequency of each of the plurality of partitions; and removing a partition of the plurality of partitions based upon a need for additional storage for a new partition.

2. The method of claim 1 wherein the read or write command is assigned to one of the plurality of partitions based upon one or more characteristics of a workload associated with the read or write command.

3. The method of claim 2, wherein the one or more characteristics of the workload include a typical transfer size of I/O operation.

4. The method of claim 1, wherein an I/O operation directed to a first partition of the plurality of partitions will not affect the mapping tables associated with the remaining plurality of partitions.

5. The method of claim 1, wherein one or more of the plurality of partitions includes at least a portion of each of the plurality of physical storage devices.

6. The method of claim 1, wherein each of the plurality of mapping tables is configured to store a physical location and a logical location of data stored in its corresponding partition.

7. The method of claim 1, wherein creating a plurality of partitions of a storage array including one or more physical storage devices is based on an architected command sent over a command interface.

8. A method of optimizing the performance of a solid state memory device by partitioning, the method comprising:

creating a plurality of partitions of a storage array including a plurality of physical storage devices, wherein each of the plurality of partitions are configured to store pages evicted from a main memory, wherein at least a first portion of a first partition of the plurality of partitions resides on at least two of the plurality of physical storage devices, and wherein at least a second partition of the plurality of partitions is entirely stored on only one of the plurality of physical storage devices;

configuring the plurality of partitions to allocate a first portion of the plurality of partitions for small random access files and a second portion of the plurality of partitions for large random access files;

creating a plurality of mapping tables, each corresponding to one of the partitions, wherein a logical to physical lookup for data stored in each of the partitions is managed by only a single one of the plurality of mapping tables;

receiving a read or write command to a logical address; and mapping the read or write command to one of the plurality of partitions and mapping tables, wherein each of the plurality of mapping tables is configured to support a different ratio of logical to physical addresses to enable different levels of overprovisioning for each partition, wherein the level overprovisioning for each of the plurality of partitions is based on and positively correlated with a write frequency of each of the plurality of partitions; and removing a partition of the plurality of partitions based upon a need for additional storage for a new partition.

* * * * *